US008677940B1

(12) United States Patent
Anderson et al.

(10) Patent No.: US 8,677,940 B1
(45) Date of Patent: Mar. 25, 2014

(54) HAY FEEDER

(71) Applicants: Kristine R. Anderson, North Branch, MN (US); Erin Olson, North Branch, MN (US)

(72) Inventors: Kristine R. Anderson, North Branch, MN (US); Erin Olson, North Branch, MN (US)

(*) Notice: Subject to any disclaimer, the term of this patent is extended or adjusted under 35 U.S.C. 154(b) by 0 days.

(21) Appl. No.: 13/656,472

(22) Filed: Oct. 19, 2012

Related U.S. Application Data

(60) Provisional application No. 61/549,334, filed on Oct. 20, 2011.

(51) Int. Cl.
*A01K 5/01* (2006.01)

(52) U.S. Cl.
USPC .................................. 119/65; 119/69

(58) Field of Classification Search
USPC ............. 119/65, 68, 69, 51.01, 51.03, 60
See application file for complete search history.

(56) References Cited

U.S. PATENT DOCUMENTS

| | | | | |
|---|---|---|---|---|
| 1,221,019 A | * | 4/1917 | Bowdish | 119/51.03 |
| 1,553,834 A | * | 9/1925 | Peterson | 119/60 |
| D226,098 S | * | 1/1973 | Berry | D30/128 |
| 4,887,812 A | * | 12/1989 | Moormann | 473/487 |
| 5,189,985 A | * | 3/1993 | Brady et al. | 119/60 |
| 5,203,281 A | * | 4/1993 | Harwich | 119/57.9 |
| 5,480,140 A | * | 1/1996 | Darnell | 473/466 |
| 5,779,570 A | * | 7/1998 | Bear | 473/481 |
| D449,905 S | * | 10/2001 | Laurence | D30/121 |
| 7,896,350 B2 | * | 3/2011 | Harries | 273/402 |
| 8,272,349 B2 | * | 9/2012 | Mayes, Jr. | 119/51.03 |
| 2013/0112148 A1 | * | 5/2013 | Warren | 119/65 |

* cited by examiner

*Primary Examiner* — Yvonne Abbott
(74) *Attorney, Agent, or Firm* — Briggs and Morgan, P.A.; Aleya R. Champlin; Dave Alan Lingbeck

(57) ABSTRACT

A hay feeder for preventing waste and gluttony. The hay feeder includes a support member being fastened to a structure; a net having a plurality of openings being disposed therethrough and depending from the support member; and a fastener assembly for fastening the support member to the structure.

2 Claims, 2 Drawing Sheets

HAY FEEDER

CROSS-REFERENCE TO RELATED APPLICATIONS

The present application claims priority to the provisional application Ser. No. 61/549,334, filed on Oct. 20, 2011, the disclosure of which is expressly incorporated by reference herein in its entirety.

BACKGROUND OF THE INVENTION

1. Field of the Invention

The present invention relates to feeders and more particularly pertains to a new hay feeder for preventing waste and gluttony.

2. Description of the Prior Art

The use of feeders is known in the prior art. More specifically, feeders heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a hay feeder described for installation in the corner of a box stall or the like including a pair of vertically disposed transversely extending back wall portions secured to the sides or walls of the box stall. Another prior art includes a hay feeder comprising a container for holding hay and having an open top to provide access to the hay. A wire mesh float rests on top of the hay. As hay is removed from the container the float moves down with the diminishing level of the hay. The wire mesh float allows a feeding animal to reach the hay but prevents the animal from rooting in the hay. Also another prior art includes a has feeder system which incorporates a curved arcuate section of plastic or other semi-rigid material formed to mate with the corner of an animal stall or other animal pen is disclosed. While these devices fulfill their respective, particular objectives and requirements, the aforementioned patents do not disclose a new hay feeder.

SUMMARY OF THE INVENTION

The general purpose of the present invention, which will be described subsequently in greater detail, is to provide a new hay feeder which has many of the advantages of the feeders mentioned heretofore and many novel features that result in a new hay feeder which is not anticipated, rendered obvious, suggested, or even implied by any of the prior art feeders, either alone or in any combination thereof. The present invention includes a support member being fastened to a structure; a net having a plurality of openings being disposed therethrough and depending from the support member; and a fastener assembly for fastening the support member to the structure. None of the prior art includes the combination of the elements of the present invention.

There has thus been outlined, rather broadly, the more important features of the hay feeder in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new hay feeder which has many of the advantages of the feeders mentioned heretofore and many novel features that result in a new hay feeder which is not anticipated, rendered obvious, suggested, or even implied by any of the prior art feeders, either alone or in any combination thereof.

Still another object of the present invention is to provide a new hay feeder for preventing waste and gluttony.

Still yet another object of the present invention is to provide a new hay feeder that slows down the rate at which the animal feeds so that the animal won't gorge itself.

Even still another object of the present invention is to provide a new hay feeder that prevents the animal from trampling on the hay and thus wasting feed.

These together with other objects of the invention, along with the various features of novelty which characterize the invention, are pointed out with particularly in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
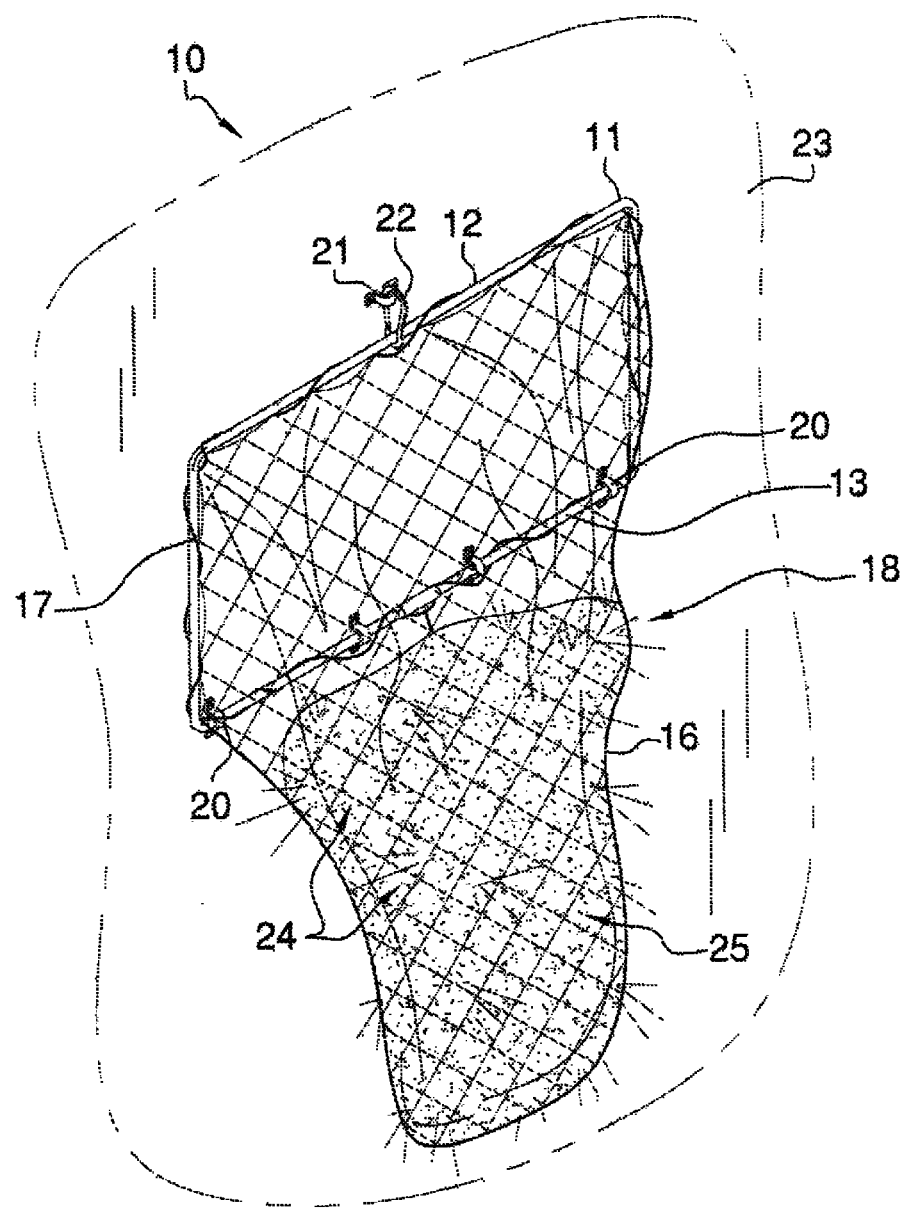
FIG. 1 is a perspective view of a new hay feeder according to the present invention being in a closed position.
Figure 2:
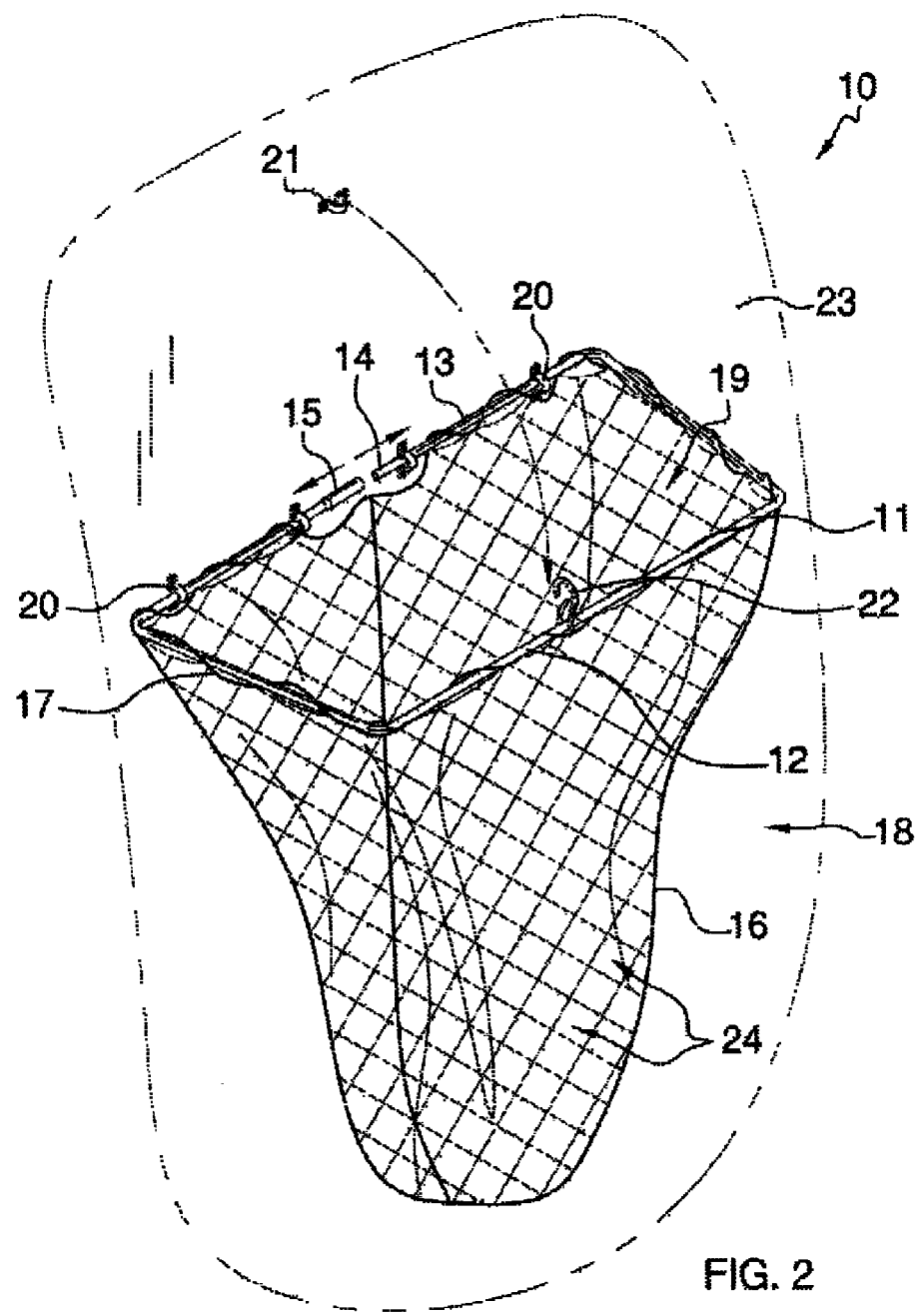
FIG. 2 is a perspective view of the present invention being in an open position to fill the feeder.

With reference now to the drawings, and in particular to FIGS. 1 through 2 thereof, a new hay feeder embodying the principles and concepts of the present invention and generally designated by the reference numeral 10 will be described.

As best illustrated in FIGS. 1 through 2, the hay feeder 10 generally comprises a support member 11 being fastened to a structure 23 and also comprises a net 16 having a plurality of openings 24 being disposed therethrough, and depending from the support member 11 and further comprises a fastener assembly 20-22 for fastening the support member 11 to the structure 23.

The support member 11 is generally a ring having mateable end portions 14,15. The mateable end portions 14,15 include a male end portion 14 and a female end portion 15; wherein the male end portion 14 is biasedly and removably received in the female end portion 15 to close the ring 11 and form an endless loop. The female end portion 15 is a sleeve. The ring 11 is disposed through openings disposed along the perimeter 17 of the net 16. The net 16 in cooperation with the ring 11 forms a basket 18 with a closed bottom and an open top 19 for holding hay therein. The ring 11 forms the open top 19 of the basket 18. Upon separating the mateable end portions 14,15, the ring 11 is strung through the perimeter openings 24 of the net 16 with the net 16 depending and being suspended from the ring 11.

The fastening assembly 20-22 includes brackets 20,21 being fastened to the structure 23 and conventionally supporting the support member 11. The support member 11 and the net 16 are suspended from the structure 23. The brackets 20,21 include first brackets 20 being spaced along a back portion 13 of the support member 11 and each includes an arcuate middle portion and opposed wing portions. The support member 11 pivots about the back portion 13 of the ring between the structure 23 and the arcuate main portions of the first brackets 20. The brackets 20,21 also include a second bracket 21 being fastened to the structure 23 with any suitable fastener such as a nail or screw. The second bracket 21 is disposed higher upon the structure 23 relative to the first brackets 20. The fastener assembly 20-22 also includes a clip 22 being conventionally and removably fastenable to the second bracket 21 and being connectable to the support member 11 to close the open top 19 of the basket 18. The clip 22 is connectable to a front portion 12 of the support member 11. The support member 11 is pivotable about the back portion 13 thereof from an open position with the clip 22 not being fastened to the second bracket 21 and the open top 19 of the basket 18 not facing the structure 23 to a closed position with the clip 22 being fastened to the second bracket 21 and the open top 19 of the basket 18 facing the structure 23 with the structure 23 actually closing the open top 19 of the basket 18. The basket 18 is fillable with hay 25 through the open top 19 of the basket 18 when the open top 19 of the basket 18 is not facing the structure 23 and the front portion 12 of the support member 11 is not fastened to the second bracket 21.

In use, the user effectively holds the support member 11 such that the open top 19 is not facing the structure 23 and puts hay 25 in the basket 18 through the open top 19. Before putting in the hay 25, the user pivots the support member 11 to expose the open top 19 of the basket 18. Once the basket 18 is filled with hay 25, the user then fastens the support member 11 to the structure 23 to close the open top 19 of the basket 18 to allow an animal to feed on the hay 25 through openings 24 of the net 16. The user closes the open top 19 of the basket 18 in cooperation with the structure 23 by pivoting the front portion 12 of the support member 11 upwardly to face the open top 19 toward the structure 23. Then the user secures the front portion 12 of the support member 11 to the structure 23 by fastening the front portion 12 of the support member 11 to the structure 23 using the clip 22.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the hay feeder. Further, since numerous modifications and changes will readily occur to those skilled in the art, it is not desired to limit the invention to the exact construction and operation shown and described, and accordingly, all suitable modifications and equivalents may be restored to, falling within the scope of the invention.

We claim:

1. A hay feeder comprising:
a support member adapted to be fastened to a structure;
a net having a plurality of openings being disposed therethrough and depending from said support member;
a fastener assembly for fastening said support member to said structure, wherein said fastening assembly includes brackets adapted to be fastened to said structure and supporting said support member, said support member and said net adapted to be suspended from said structure,
wherein said brackets include first brackets being spaced along a back portion of said support member; wherein said support member is capable of pivoting about said back portion relative to said first brackets and to said structure;
wherein said brackets also include a second bracket being fastened to said structure, said second bracket being disposed higher upon said structure relative to said first brackets;
and wherein said fastener assembly also includes a clip being fastenable to said second bracket and being connectable to said support member to close said open top of said bracket.

2. The hay feeder as described in claim 1, wherein said clip is connectable to a front portion of said support member, said support member being pivotable about said back portion thereof from an open position with said clip not being fastened to said second bracket and said open top of said basket not facing said structure to a closed position with said clip being fastened to said second bracket and said open top of said basket facing said structure, said basket being fillable with hay through said open top of said basket when said open top of said basket is not facing said structure.

* * * * *